(12) United States Patent
Lee et al.

(10) Patent No.: US 8,437,434 B1
(45) Date of Patent: *May 7, 2013

(54) MULTI-STREAM MAXIMUM-LIKELIHOOD DEMODULATION BASED ON BITWISE CONSTELLATION PARTITIONING

(75) Inventors: Jungwon Lee, Cupertino, CA (US); Jiwoong Choi, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,960

(22) Filed: Aug. 6, 2012

Related U.S. Application Data

(63) Continuation of application No. 12/547,285, filed on Aug. 25, 2009, now Pat. No. 8,238,488.

(60) Provisional application No. 61/093,601, filed on Sep. 2, 2008.

(51) Int. Cl.
*H03D 1/00* (2006.01)
*H04L 27/06* (2006.01)

(52) U.S. Cl.
USPC ............................................ 375/341; 375/262

(58) Field of Classification Search .......... 375/259–262, 375/316, 340, 341
See application file for complete search history.

(56) References Cited

U.S. PATENT DOCUMENTS

| | | | | |
|---|---|---|---|---|
| 7,489,746 | B1 * | 2/2009 | Awater et al. | 375/341 |
| 7,583,763 | B2 * | 9/2009 | Nissani | 375/341 |
| 8,238,488 | B1 * | 8/2012 | Lee et al. | 375/341 |
| 2003/0125040 | A1 * | 7/2003 | Walton et al. | 455/454 |

(Continued)

FOREIGN PATENT DOCUMENTS

| | | | |
|---|---|---|---|
| WO | WO-2006/043369 | | 4/2006 |
| WO | WO 2006043369 | * | 4/2006 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medimum Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — David C. Payne
*Assistant Examiner* — James M Perez

(57) ABSTRACT

A plurality of received data symbols is received, and a first received data symbol is selected from the plurality of received data symbols. A plurality of global optimum candidate values of a first estimated transmitted data symbol corresponding to the first received data symbol is determined for different given candidate values of second estimated transmitted data symbols corresponding to second received data symbols. Likelihood values for bits corresponding to the second estimated transmitted data symbols are calculated using the plurality of global optimum candidate values. All possible values of the first estimated transmitted data symbol are grouped into two or more bit groups, and a plurality of local optimum candidate values are determined for different bit groups. Likelihood values for bits corresponding to the first estimated transmitted data symbol are calculated using the plurality of global optimum candidate values and the plurality of local optimum candidate values.

19 Claims, 6 Drawing Sheets

U.S. PATENT DOCUMENTS

| | | | |
|---|---|---|---|
| 2005/0002359 A1* | 1/2005 | Kim | 370/334 |
| 2005/0201478 A1* | 9/2005 | Claussen et al. | 375/261 |
| 2005/0259771 A1* | 11/2005 | Higuchi et al. | 375/347 |
| 2006/0056550 A1* | 3/2006 | Skraparlis et al. | 375/347 |
| 2006/0209994 A1* | 9/2006 | Graef et al. | 375/340 |
| 2007/0183541 A1* | 8/2007 | Moorti et al. | 375/341 |
| 2007/0197166 A1* | 8/2007 | Kawamoto et al. | 455/65 |
| 2007/0229329 A1* | 10/2007 | Maru | 341/94 |
| 2008/0095257 A1* | 4/2008 | Maeda et al. | 375/262 |
| 2009/0060078 A1* | 3/2009 | van Zelst et al. | 375/262 |
| 2010/0086067 A1* | 4/2010 | Oka | 375/260 |
| 2011/0051832 A1* | 3/2011 | Mergen et al. | 375/267 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHZ band—Corrigendum 1," *The Institute of Electrical and Electronics Engineers, Inc.* (2001).

IEEE Std 802.11g/D8.2, Apr. 2003 (Supplement to ANSI/IEEE Std 802.11, 1999 (Reaff 2003)) "Draft Supplement to Standard [for] Information Technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.* (2003).

S. A. Mujtaba, "IEEE P802.11—Wireless LANS, TGn Sync Proposal Technical Specification," doc.: IEEE 802.11—04/0889r6 (2005).

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.* (2004).

\* cited by examiner

MULTI-STREAM MAXIMUM-LIKELIHOOD DEMODULATION BASED ON BITWISE CONSTELLATION PARTITIONING

CROSS REFERENCE TO RELATED APPLICATION

The present application is a continuation of U.S. patent application Ser. No. 12/547,285, entitled "Multi-Stream Maximum-Likelihood Demodulation Based on Bitwise Constellation Partitioning," filed on Aug. 25, 2009, now U.S. Pat. No. 8,238,488, which claims the benefit of U.S. Provisional Application No. 61/093,601, entitled "MIMO Soft ML Demodulation Based on Bit-Wise Constellation Partitioning," filed on Sep. 2, 2008. Both of the above-referenced applications are hereby incorporated by reference herein in their entireties.

FIELD OF TECHNOLOGY

The present disclosure relates generally to multi-antenna wireless systems and, more particularly, to a multi-stream maximum-likelihood demodulation.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier. Data upon each sub-carrier may be modulated with a modulation scheme such as QAM, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Various other standards and projects, such as the 802.16 standard, or WiMAX, and the Long Term Evolution (LTE) project, support MIMO techniques. Generally speaking, the use of MIMO technology produces significant increases in spectral efficiency and link reliability of IEEE 802.11, IEEE 802.16, and other systems, and these benefits generally increase as the number of transmit and receive antennas within the MIMO system increases.

In addition to the frequency sub-channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments, such as noise, as compared to modulation schemes with a lower bit rate.

Different modulation/demodulation schemes have various degrees of complexity, and complexity of a given demodulation technique may affect the complexity of a receiver. Higher complexity of a demodulation technique generally requires more complexity on the receiver, e.g., more, larger, and/or more expensive processing modules and/or components. Higher complexity of a demodulation technique may also lead to an increase in processing time.

SUMMARY OF THE DISCLOSURE

The present disclosure provides methods and apparatus for decoding a signal transmitted via a multiple input multiple output (MIMO) communication channel.

In one embodiment, a method includes receiving a plurality of received data symbols, and selecting a first received data symbol from the plurality of received data symbols, wherein the plurality of received data symbols also includes second received data symbols. The method also includes determining a plurality of global optimum candidate values of a first estimated transmitted data symbol corresponding to the first received data symbol for different given candidate values of second estimated transmitted data symbols corresponding to the second received data symbols, and calculating likelihood values for bits corresponding to the second estimated transmitted data symbols using the plurality of global optimum candidate values of the first estimated transmitted data symbol. Additionally, the method includes grouping all possible values of the first estimated transmitted data symbol into two or more bit groups, and determining a plurality of local optimum candidate values for different bit groups and for different given candidate values of second estimated transmitted data symbols corresponding to the second received data symbols. The method further includes calculating likelihood values for bits corresponding to the first estimated transmitted data symbol using the plurality of global optimum candidate values of the first estimated transmitted data symbol and the plurality of local optimum candidate values.

In another embodiment, a device comprises a multi-stream maximum-likelihood (ML) demodulator configured to select one of a plurality of candidate data symbols, the plurality of candidate data symbols defining a candidate vector, wherein the plurality of candidate data symbols correspond to a plurality of transmitted data symbols, wherein a received data symbol vector comprises a plurality of data symbols corresponding to the plurality of transmitted data symbols. The ML demodulator is also configured to group all possible values of the selected one candidate data symbol into two or more bit groups, and select a bit group from the two or more bit groups. Further, the ML demodulator is configured to determine a local optimum candidate value from values in the selected bit group for the selected one candidate data symbol for a given set of values corresponding to all of the plurality of candidate data symbols but the selected one candidate data symbol, the local optimum candidate value minimizing a distance value corresponding to a distance between the received data symbol vector and a channel matrix multiplied with the candidate vector, without calculating the distance value. Additionally, the ML demodulator is configured to calculate a likelihood value for a bit in the selected one candidate data symbol based at least in part on the determined local optimum candidate value. The device also comprises a decoder to decode the received data symbol vector based at least in part on (i) the likelihood values for bits corresponding to the first estimated transmitted data symbol and (ii) the likelihood values for bits corresponding to the second estimated transmitted data symbols.

BRIEF DESCRIPTION OF THE DRAWINGS

Like reference numbers and designations in the various drawings indicate like elements. Furthermore, when individual elements are designated by references numbers in the form Nn, these elements may be referred to in the collective by N. For example, FIGS. 2A and 2B illustrate transmitting devices 200a and 200b that may be referred to collectively as transmitting device(s) 200.

DETAILED DESCRIPTION

Figure 1:
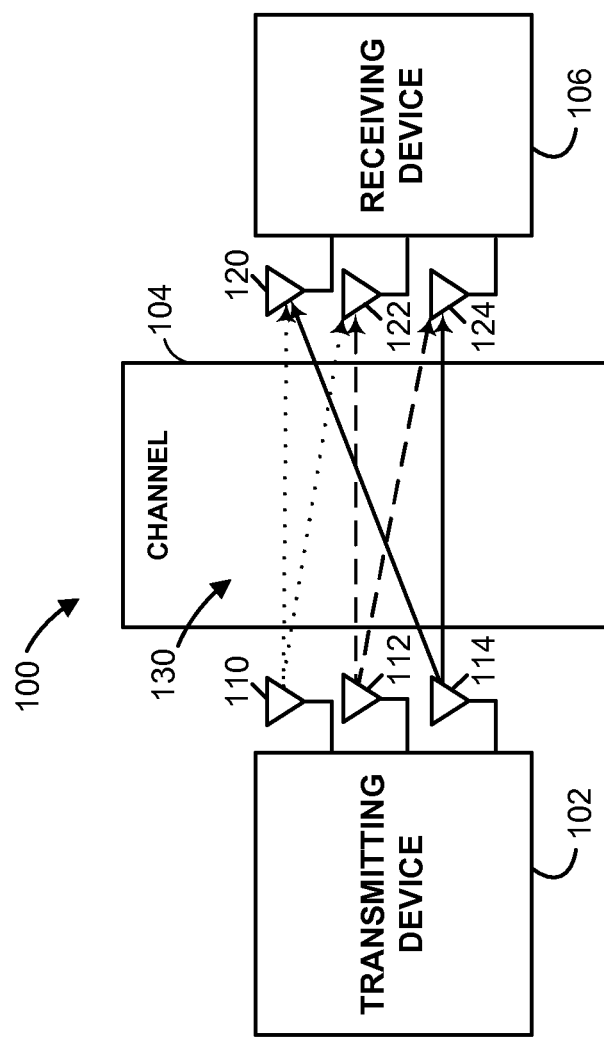
FIG. 1 is a block diagram of an example wireless communication system.

FIG. 1 is a block diagram of an example wireless communication system 100 in which multiple devices, e.g., a transmitting device 102 and a receiving device 106 may communicate with each other via a shared wireless communication channel 104. Each of the devices 102 and 106 may be, for example, a base station or a mobile station equipped with a set of antennas 110-114 and 120-124, respectively. Although the wireless communication system 100 illustrated in FIG. 1 includes two devices, the wireless communication system 100 may, of course, include any number of devices, each equipped with the same or a different number of antennas (e.g., 1, 2, 3, 4 antennas and so on).

Furthermore, although the wireless communication system 100 illustrated in FIG. 1 includes a transmitting device 102 and a receiving device 106, devices in the wireless communication system 100 may generally operate in multiple modes (e.g., a transmit mode and a receive mode). In application to a high-definition (HD) television, for example, the HD television may operate solely as a wireless receiver, but not as a wireless transmitter. On the other hand, if a given device is a mobile station in a WiMAX communication network or a laptop computer having an IEEE Standard 802.11n compliant wireless transceiver, the device may operate in both, a transmit mode and a receive mode. Accordingly, in some embodiments, antennas 110-114 and 120-124 may support both transmission and reception. Alternatively, or additionally, a given device may include separate transmit antennas and separate receive antennas.

Different numbers of spatial streams 130 may be transmitted between the antennas 110-114 and 120-124 in various embodiments and/or configurations of the transmitting device 102 and/or the receiving device 104. Typically, the number S of spatial streams 130 associated with a shared communication channel 106 is less than or equal to minimum of the number $N_T$ of transmit antennas 110-114 and the number $N_R$ of receive antennas 120-124 (i.e., S=min($N_T$,$N_R$)) The streams 130 may be defined in a variety of way, e.g., according to various multiple-input and multiple-output (MIMO) modes or schemes, including those known in the art. For example, the transmitting device 102 may use the antennas 110-114 to improve channel diversity by transmitting multiple copies of the same symbol via several streams. Alternatively, the transmitting device 102 may transmit different symbols via each of the antennas 110-114 to increase throughput. As yet another alternative, the transmitting device 102 may operate in a mixed MIMO mode to improve both channel diversity and throughput.

The transmitting device 102 and the receiving device 106 may communicate using a single frequency or multiple frequencies (i.e., the number of frequency channels K>1). When K is more than one, the communication channel 104 thus includes K carriers or subcarriers $C_1$, $C_2$, . . . , $C_K$, each associated with a particular frequency at which the devices 102 and 106 may communicate. In some embodiments, the wireless communication system 100 may use an OFDM technique, and the subcarriers $C_1$, $C_2$, . . . $C_K$ may be selected to be mutually orthogonal (i.e., to minimize cross-talk between each pair of subcarriers). However, the wireless communication system 100 could also use any other frequency division multiplexing technique.

The receiving device 106 may be configured to perform a multi-stream ML demodulation technique to be described in more detail below. Before describing the multi-stream demodulation techniques in detail, it is helpful to briefly explain how signals may be modulated.

Figure 2A:
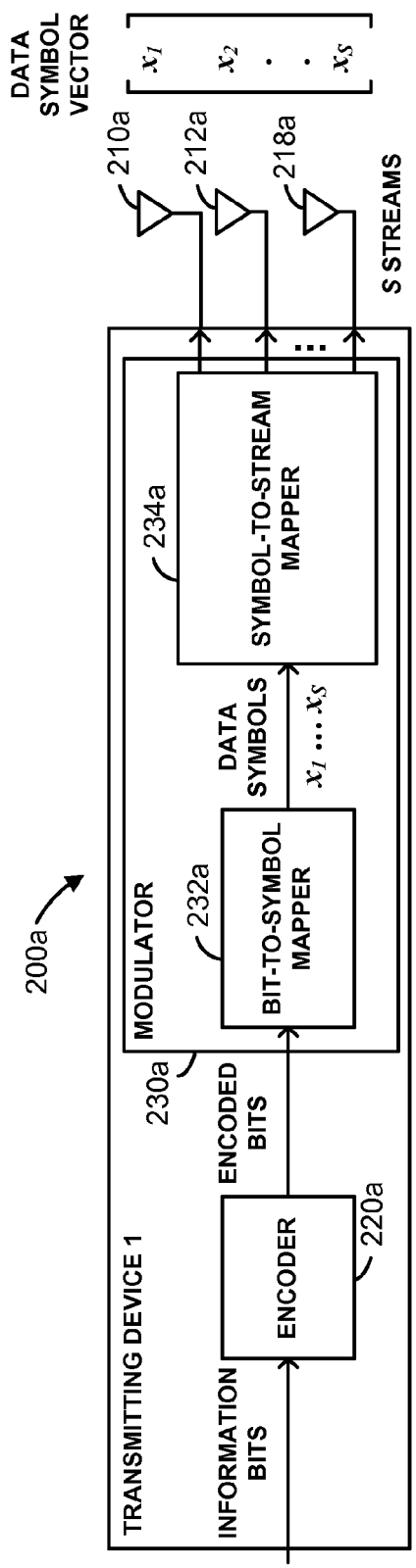
FIG. 2A is a block diagram of an example transmitting device.
Figure 2B:
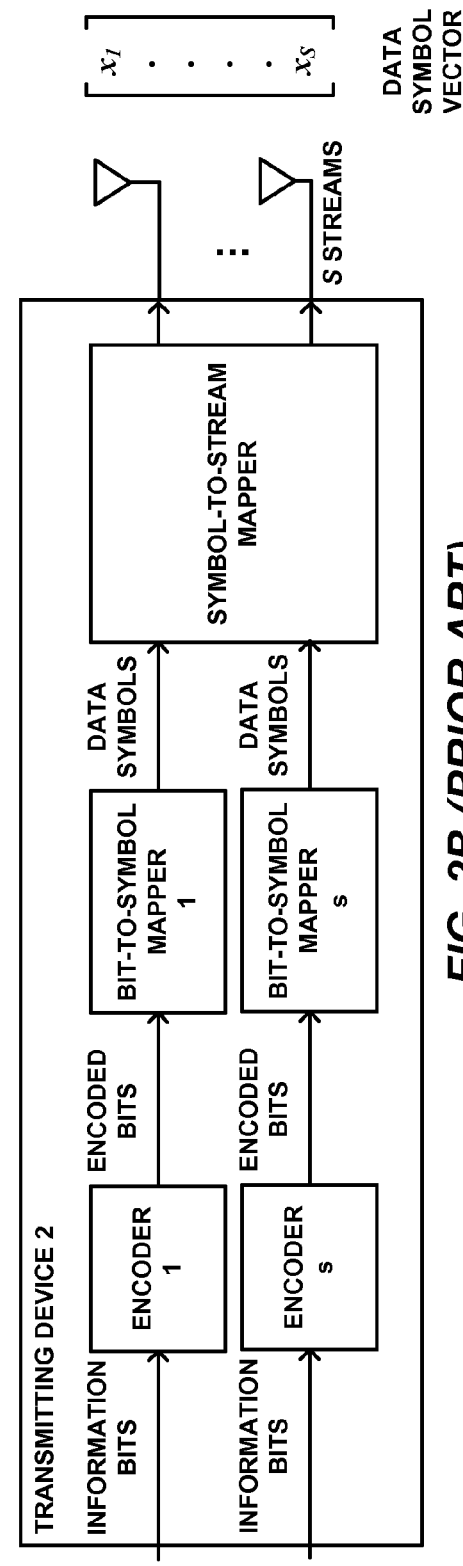
FIG. 2B is a block diagram of another example transmitting device.

FIGS. 2A-2B are block diagrams of example transmitting devices 200. The transmitting devices 200 may be utilized in the wireless communication system 100 as the transmitting device 102, for example. It will be understood, however, that the wireless communication system 100 may alternatively use another transmitting device 102.

Referring to FIG. 2A, the transmitting device 200a may generally convert a sequence of information bits into signals appropriate for transmission through a wireless channel (e.g., channel 104). More specifically, the transmitting device 200a may include an encoder 220a (e.g., a convolution encoder) that encodes information bits, and a modulator 230a that modulates the encoded bits into data symbols, which are mapped and converted to signals appropriate for transmission via transmit antennas 210a-218a. The transmitting device 200a may include various additional modules that, for ease of explanation, are not shown in FIG. 2A. For example, the transmitting device 200a may include an interleaver that interleaves the encoded bits to mitigate burst errors. The transmitting device 200a may further include an analog radio frequency (RF) front end for performing frequency upconversion, various filters, power amplifiers, and so on.

The modulator 230a may include a bit-to-symbol mapper 232a that maps encoded bits into multiple data symbols, and a symbol-to-stream mapper 234a that maps the multiple data symbols into multiple parallel data streams. For example, the modulator 230a may generate S parallel data streams that may be represented by a data symbol vector x=[$x_1$, $x_2$, . . . , $x_S$], and each individual symbol $x_s$ in the data symbol vector x may be a symbol representative of W bits ($b_{s,1}$, $b_{s,2}$, . . . , $b_{s,W}$). Accordingly, a given bit $b_{s,n}$ is the n-th bit in a data symbol of the s-th stream.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa.

Figures 3A, 3B:
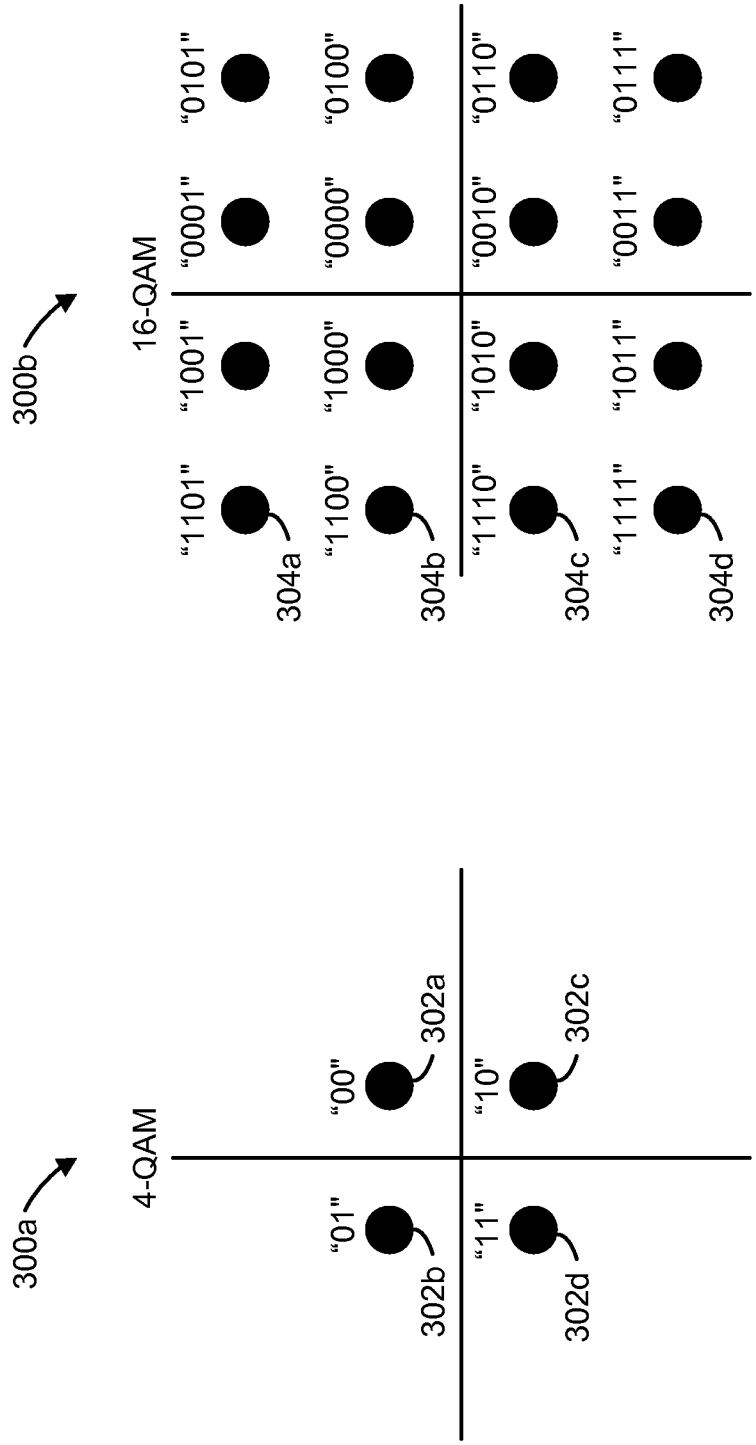
FIG. 3A is an example constellation set for a 4-QAM scheme.
FIG. 3B is an example constellation set for a 16-QAM scheme.

In some embodiments, the modulator 230a may use QAM to map bits to symbols in a QAM signal constellation set, where the symbols are differentiated from one another by phase and/or magnitude. For example, FIG. 3A illustrates a 4-QAM constellation set 300a in an in phase (I) and quadrature phase (Q) plane. In this case, constellation points 302a-302d are distinguishable only by phase. Each constellation point 302 represents a different two-bit symbol: 302a may represent "00," 302b may represent "01," 302c may represent "10," and 302d may represent "11." However, other bit to symbol mappings may be utilized.

Similarly, FIG. 3B illustrates a 16-QAM constellation set 300b, where four-bit sequences correspond to symbols. Here, both the amplitude and the phase of constellation points 304 may vary. FIG. 3B illustrates a mapping, where each constellation point 304 represents a different four-bit symbol: 304a may represent "1101," 304b may represent "1100," 304c may represent "1110," 304d may represent "1111," and so on. However, as discussed in reference to FIG. 3B, other mappings may be utilized.

In general, a W-bit symbol $x_s$ may be mapped according to an M-QAM signal set, where $M=2^W$. Thus, as illustrated in FIG. 3A, if the modulator 230a uses the 4-QAM modulation scheme, or a quadrature phase-shift keying (QPSK) modulation scheme, the modulator 230a will have a signal alphabet size of $M=2^2=4$ (i.e., 4 constellation points), and will map 2-bit pairs into the 4 constellation points. If the modulator 230a uses a 64-QAM scheme, the modulator 230a will have an alphabet size of $M=2^6=64$ (i.e., 64 constellation points) and will map 6-bit segments into the 64 constellation points.

It should be noted that although the transmitting device 200a described with reference to FIG. 2A includes a common encoder chain (an encoder 220a, an interleaver (not shown), a modulator 230a, etc.), a transmitting device 200 may include different encoder chains for different streams. For example, as illustrated in FIG. 2B, each stream generated by the transmitting device 200b may correspond to a separate encoder chain. Other transmitting devices, such as those supporting the WiMAX standards, for example, may support both a single-encoder option and a two-encoder option for a two-transmit-antenna configuration. In general, the number of encoders and/or encoder chains may be less than or equal to the number of transmitted streams S.

Figure 4:
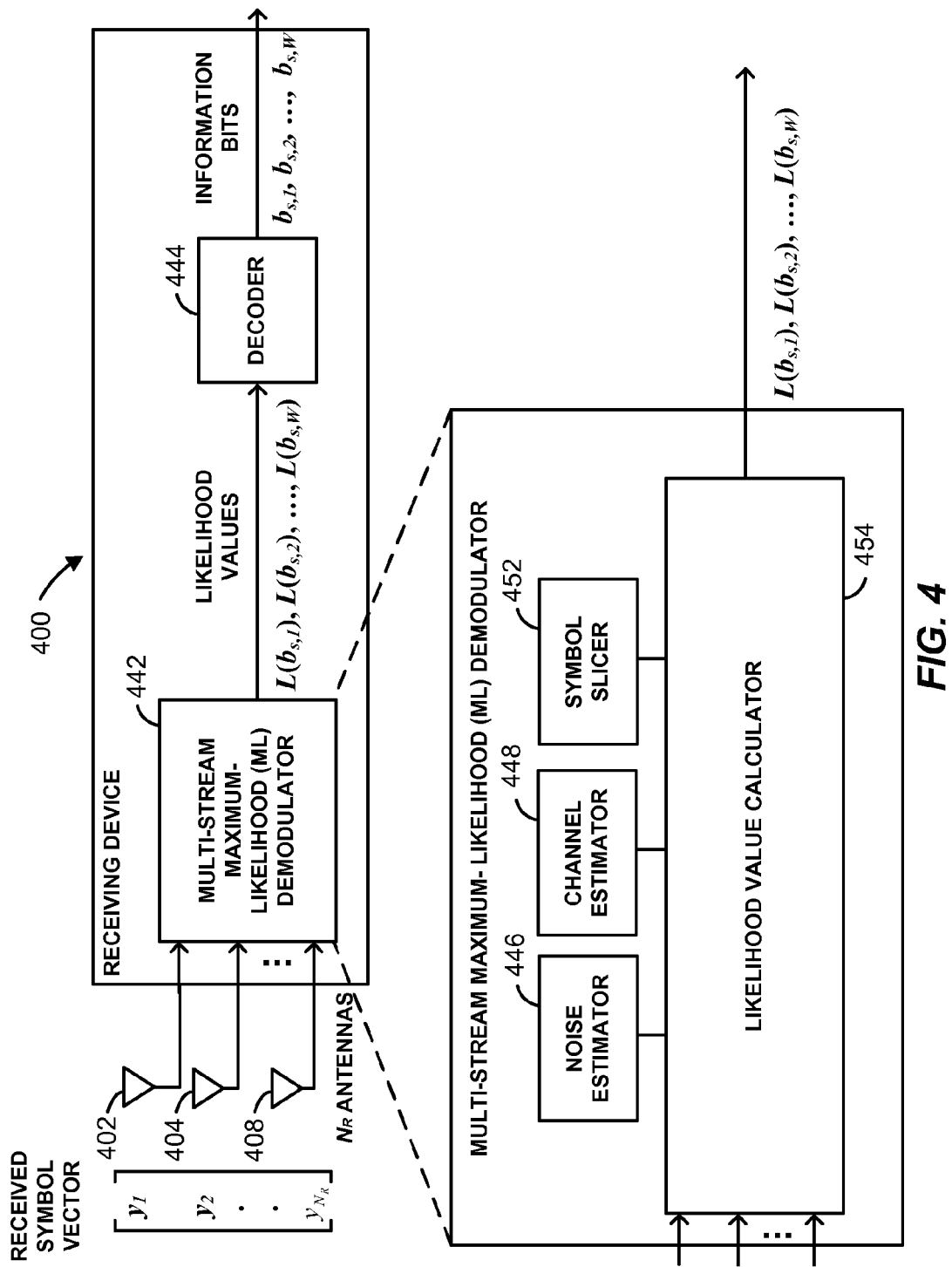
FIG. 4 is a block diagram of an example receiving device having a multi-stream maximum-likelihood (ML) demodulator.

FIG. 4 is a block diagram of an example receiving device 400 capable of demodulating and decoding signals from one or more transmitting devices using a multi-stream maximum-likelihood (ML) demodulation scheme. The receiving device 400 may be utilized in the wireless communication system 100 as the receiving device 106, for example. It will be understood, however, that the wireless communication system 100 may alternatively use another receiving device 106. Similarly, the receiving device 400 may receive and demodulate multiple streams transmitted by a device such as the transmitting device 200a of FIG. 2A or the transmitting device 200b of FIG. 2B or some other transmitting device.

Generally, the receiving device 400 may receive information via multiple receive antennas 402-408 and demodulate and decode the received information to estimate the information that was sent by a transmitting device. The receiving device 400 processes received information utilizing a model, such as:

$$y = Hx + z, \text{ where}$$

$$y = \begin{bmatrix} y_1 \\ y_2 \\ \vdots \\ y_{N_R} \end{bmatrix}; H = \begin{bmatrix} h_{1,1} & h_{1,2} & \ldots & h_{1,S} \\ h_{2,1} & h_{1,2} & \ldots & h_{2,S} \\ \vdots & \vdots & \vdots & \vdots \\ h_{N_R,1} & h_{N_R,2} & \ldots & h_{N_R,S} \end{bmatrix};$$

$$x = \begin{bmatrix} x_1 \\ x_2 \\ \vdots \\ x_S \end{bmatrix}; z = \begin{bmatrix} z_1 \\ z_2 \\ \vdots \\ z_{N_R} \end{bmatrix},$$

in which y represents, in vector from, the receive signal, H represents the MIMO communication channel, x represents, in vector form, the estimated transmit signal, z represents the noise vector, and $N_R$ is the number of receive antennas. More precisely, $y_r$ is a received signal at antenna r, and $z_r$ is noise at an antenna r.

The MIMO communication channel H includes channel gain parameters $h_{r,s}$ channel gain in a stream s at a receive antenna r. In at least some of the embodiments, each channel gain $h_{r,s}$ is a complex number that incorporates an amplitude factor and a phase shift factor. In other words, each $h_{r,s}$ parameter may represent an attenuation coefficient associated with a certain propagation path as used in, for example, a Rayleigh fading channel model. The receiving device 400 may estimate the parameters $h_{r,s}$, and parameters associated with the noise z using any technique, including known techniques.

With continued reference to FIG. 4, the receiving device 400 includes a multi-stream maximum-likelihood (ML) demodulator 442 that may calculate, based on the received symbols $y_1, y_2, \ldots, y_{N_R}$, likelihood values $L(b_{s,1})$, $L(b_{s,2}), \ldots, L(b_{s,W})$ of the transmitted bits $b_{s,1}, b_{s,2}, \ldots, b_{s,W}$. The receiving device 400 also includes a decoder 444 that may use the likelihood values $L(b_{s,1}), L(b_{s,2}), \ldots, L(b_{s,W})$ calculated by the ML demodulator 442 to estimate the transmitted information bits $b_{s,1}, b_{s,2}, \ldots, b_{s,W}$. Because the ML demodulator 442 outputs likelihood values for bits, and not the bits themselves, the ML demodulator 442 is called a "soft" demodulator. By contrast, demodulators that output bits are called "hard-decision demodulators," or simply "hard demodulators."

As illustrated in FIG. 4, the multi-stream ML demodulator 442 may include various modules and/or components. For example, the multi-stream ML demodulator 442 may include a likelihood value calculator 454 for calculating likelihood values $L(b_{s,1}), L(b_{s,2}), \ldots, L(b_{s,W})$. The multi-stream ML demodulator 442 may further include a symbol slicer 452 that performs various symbol slicing operations (e.g., QAM slicing), including known symbols slicing operations. Still further, the multi-stream ML demodulator 442 may include a channel estimator 448 to estimate the MIMO communication channel H and a noise estimator 446 for generating noise estimate information, including, for example, the variance of the noise $\sigma_z^2$.

The multi-stream ML demodulator 442, in some embodiments, or in some modes of operation, may not include one or more of the modules 446-454 or, alternatively, may not use each of the modules 446-454 in demodulating the received signals. Further, it will be appreciated that some of the modules 446-454 may be combined. Still further, the multi-stream ML demodulator 442 and/or the receiving device 400 may include additional components and/or modules that, for ease of explanation, are not shown in FIG. 4. For example, the receiving device 400 may include a linear equalizer, e.g., a zero-forcing equalizer, that may be used by the multi-stream ML demodulator 442 to estimate the transmitted data values, $x_s$ from the received signal $y_s$ by assuming the noise vector z is zero. Additionally the receiving device 400 may include a deinterleaver that rearranges scattered bits and restores the proper bit sequence, an analog RF front end that performs frequency downconversion, various filters, power amplifiers, and so on.

Different components and/or modules of the receiving device 400 may be implemented as hardware, a processor executing software instructions, a processor implementing firmware instructions, or some combination thereof. For example, some or all of the components may be custom integrated circuits, application-specific integration circuits (ASICs), etc., communicatively coupled by electrical busses. In this case, the receiving device 400 optionally may include bypass busses (not shown) to bypass some of the components if the currently active MIMO mode does not require certain operations, such as processing multiple presentations of a symbol encoded according to a space-time encoding scheme.

In order to calculate the likelihood values $L(b_{s,1})$, $L(b_{s,2}), \ldots, L(b_{s,W})$ for the received symbols, the multi-stream ML demodulator 442 may calculate a log-likelihood ratio (LLR) for each bit $b_{s,1}, b_{s,2}, \ldots, b_{s,W}$. The LLR of a given bit $b_{s,n}$ may be an indication of whether the bit $b_{s,n}$ is more likely to be 1 or 0, and it may be calculated as follows:

$$L(b_{s,n}) = \log\left(\frac{P\{y \mid b_{s,n} = 1\}}{P\{y \mid b_{s,n} = 1\}}\right) = \log(P\{y \mid b_{s,n} = 1\}) - \log(P\{y \mid b_{s,n} = 0\}) \quad (1)$$

where $P\{y|b_{s,n}=0\}$ is the probability that the bit $b_{s,n}$ is equal to 0 and $P\{y|b_{s,n}=1\}$ is the probability that the bit $b_{s,n}$ is equal to 1. If the calculated $L(b_{s,n})$ is a relatively large positive number, the probability that the bit $b_{s,n}$ is equal to 1 may be much greater than the probability that the bit $b_{s,n}$ is equal to 0, and the decoder 444 may therefore conclude that bit $b_{s,n}$ is equal to 1 Likewise, if the calculated $L(b_{s,n})$ is a large negative number, the probability that the bit $b_{s,n}$ is equal to 0 may be much greater than the probability that the bit $b_{s,n}$ is equal to 1, and the decoder 444 may therefore conclude that bit $b_{s,n}$ is equal to 0. If the calculated $L(b_{s,n})$ is neither a large positive number nor a large negative number, the decoder 444 may need to perform additional processing to estimate the value of bit $b_{s,n}$. As explained above, the receiving device 400 may receive more than one representation of bit $b_{s,n}$, e.g., via different ones of the receive antennas 402-408. Accordingly, the decoder 444 may use multiple LLRs corresponding to multiple representations of the same bit $b_{s,n}$ to estimate the value of bit $b_{s,n}$.

In order to estimate the probability that bit $b_{s,n}$ is equal to 1 and the probability that bit $b_{s,n}$ is equal to 0, the multi-stream ML demodulator 442 may use the following equations:

$$P\{y \mid b_{s,n} = 1\} = \sum_{x \in X_{s,n}^{(1)}} \exp\left(-\frac{\|y - Hx\|^2}{\sigma_z^2}\right) \quad (2)$$

$$P\{y \mid b_{s,n} = 0\} = \sum_{x \in X_{s,n}^{(0)}} \exp\left(-\frac{\|y - Hx\|^2}{\sigma_z^2}\right) \quad (3)$$

where, as in equation (1), x is a vector of estimated transmitted symbols $x_1, x_2, \ldots, x_S$, $X_{s,n}^{(1)}$ is a set of all possible data symbol vectors x with bit $b_{s,n}$ equal to 1 (where $b_{s,n}$ is the n-th bit of s-th stream), $X_{s,n}^{(0)}$ is a set of all possible data symbol vectors x with bit $b_{s,n}$ equal to 0, y represents, in vector form, the received symbols $y_1, y_2, \ldots, y_{N_R}$, H represents the MIMO communication channel, and o represents the variance of the noise.

Combining equations (1)-(3), the LLR of a given bit $b_{s,n}$ in a given stream s may be calculated as:

$$L(b_{s,n}) = \log\left(\sum_{x \in X_{s,n}^{(1)}} \exp\left(-\frac{\|y - Hx\|^2}{\sigma_z^2}\right)\right) - \log\left(\sum_{x \in X_{s,n}^{(0)}} \exp\left(-\frac{\|y - Hx\|^2}{\sigma_z^2}\right)\right) \quad (4)$$

and $L(b_{s,n})$ may be approximated as:

$$L(b_{s,n}) \approx \frac{1}{\sigma_z^2}\left[\min_{x \in X_{s,n}^{(0)}} \|y - Hx\|^2 - \min_{x \in X_{s,n}^{(1)}} \|y - Hx\|^2\right] \quad (5)$$

Accordingly, the LLR of a given bit $b_{s,n}$ may be calculated based on the distances $\|y-Hx\|^2$. More specifically, the LLR of a given bit $b_{s,n}$ may be calculated based on the difference between the smallest distance $\|y-Hx\|^2$ for a set of all possible data symbols $x_s$ with $b_{s,n}$ equal to 0 and the smallest distance $\|y-Hx\|^2$ for a set of all possible data symbols $x_s$ with $b_{s,n}$ equal to 1.

Calculating the LLR of a given bit $L(b_{s,n})$ in accordance with equation (5) requires a calculation of $\|y-Hx\|^2$ for every constellation point in the constellation set in order to determine the smallest distance. Moreover, if there are multiple streams, a calculation of $\|y-Hx\|^2$ is required for every constellation point for every stream. Therefore, if a receiving device receives S streams, for example, and each stream is represented by W bits and modulated using an M-QAM scheme (where $M=2^W$), the receiving device will need to perform $M^S$ calculations of $\|y-Hx\|^2$ to demodulate the received S streams in accordance with equation (5).

In practice, it may be burdensome for a receiving device to calculate $\|y-Hx\|^2$ for every constellation point and for every streams. As the number of streams S and/or the number of bits W in a data symbol increases (i.e., as M increases), performing these calculations may require escalating complexity on the receiving device (e.g., more, larger, and/or more expensive processing modules and/or components). Performing these calculations may also lead to an increase in processing time. Accordingly, in order to reduce complexity, it is advantageous to utilize a demodulation technique that performs fewer than $M^S$ calculations of $\|y-Hx\|^2$ when calculating LLRs for received data corresponding to multiple streams.

Figure 5:
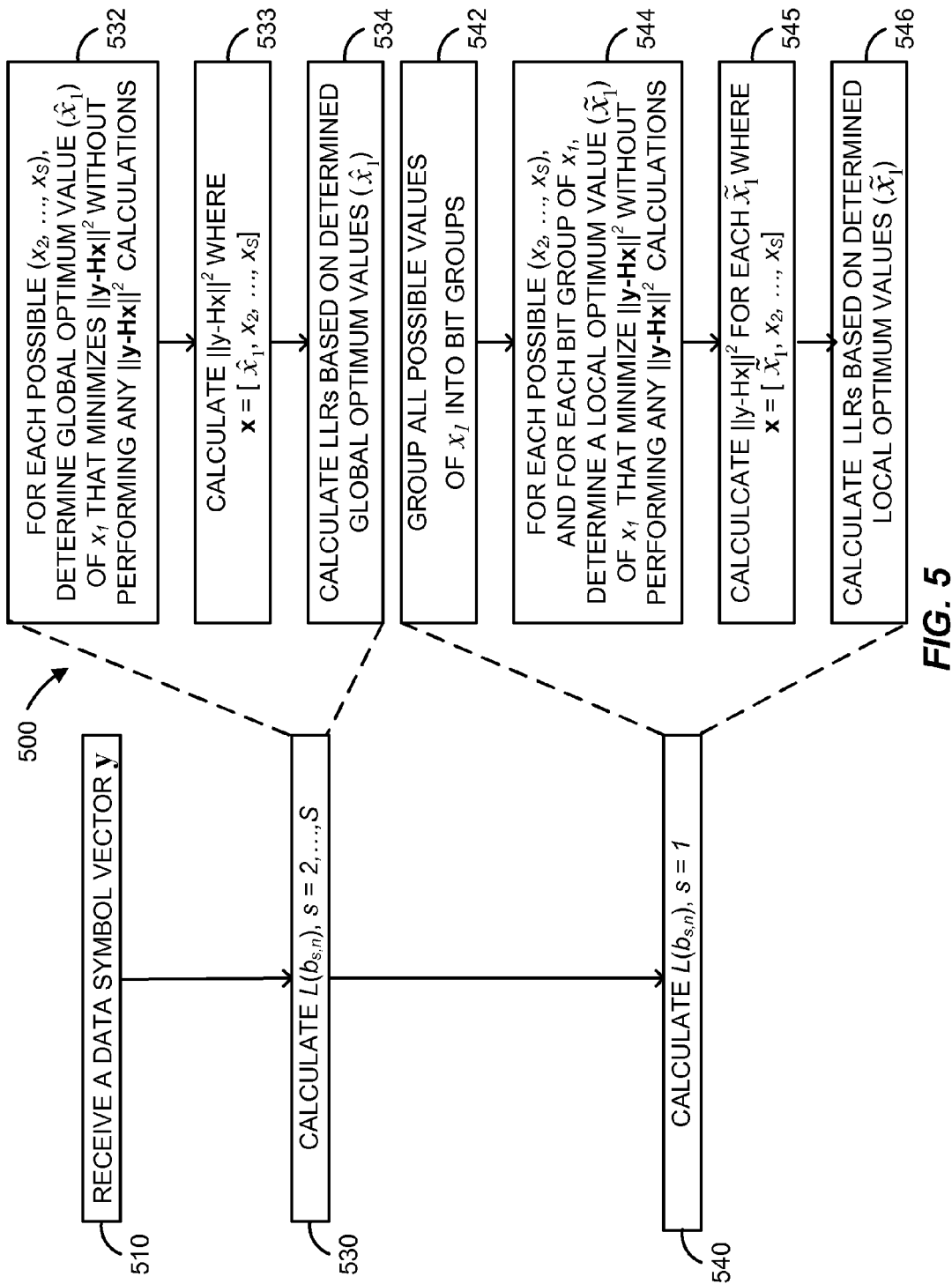
FIG. 5 is a flow diagram of an example multi-stream ML method.

FIG. 5 is a flow diagram illustrating an example multi-stream ML method 500 for calculating LLRs for received data. For ease of explanation, FIG. 5 will be described with reference to FIGS. 1-4. It will be understood, however, that the method 500 for calculating LLRs may be utilized with systems and devices other than those illustrated in FIGS. 1-4. Furthermore, for clarity and ease of explanation, the multi-stream ML method 500 for calculating LLRs illustrated in FIG. 5 will also be explained with reference to 16-QAM constellation diagrams in FIGS. 6A-6D. However, it will be understood that the multi-stream ML method 500 for calculating LLRs is not limited to 16-QAM, to QAM, or to any particular modulation scheme.

Before explaining FIG. 5 in detail, it is noted that equation (5) may be written as follows:

$$L(b_{s,n}) \approx \quad (6)$$

$$\begin{cases} \frac{1}{\sigma_z^2}\left[\begin{array}{l} \min_{(x_2,\ldots,x_S) \in \tilde{X}_{s,n}^{(0)}}\left(\min_{x_1 \in Q_{1,n}^{(0)} \cup Q_{1,n}^{(1)}} \|y - Hx\|^2\right) \\ - \min_{(x_2,\ldots,x_S) \in \tilde{X}_{s,n}^{(1)}}\left(\min_{x_1 \in Q_{1,n}^{(0)} \cup Q_{1,n}^{(1)}} \|y - Hx\|^2\right) \end{array}\right], & s = 2, \ldots, S \\ \frac{1}{\sigma_z^2}\left[\begin{array}{l} \min_{(x_2,\ldots,x_S) \in (\tilde{X}_{s,n}^{(0)} \cup \tilde{X}_{s,n}^{(1)})}\left(\min_{x_1 \in Q_{1,n}^{(0)}} \|y - Hx\|^2\right) \\ - \min_{(x_2,\ldots,x_S) \in (\tilde{X}_{s,n}^{(0)} \cup \tilde{X}_{s,n}^{(1)})}\left(\min_{x_1 \in Q_{1,n}^{(1)}} \|y - Hx\|^2\right) \end{array}\right], & s = 1 \end{cases}$$

where:

$\tilde{X}_{s,n}^{(0)}$ is a set of all possible data symbols $x_2, \ldots, x_S$ with $b_{s,n}$ equal to 0;

$\tilde{X}_{s,n}^{(1)}$ is a set of all possible data symbols $x_2, \ldots, x_S$ with $b_{s,n}$ equal to 1;

$Q_{s,n}^{(0)}$ is a set of all possible data symbols $x_1$ with $b_{s,n}$ equal to 0; and $Q_{s,n}^{(1)}$ is a set of all possible data symbols $x_1$ with $b_{s,n}$ equal to 1.

Accordingly, LLRs for different data symbols $x_1, \ldots, x_S$ may be calculated separately. That is, referring to FIG. 5, when a receiving device (such as the receiving device 400 illustrated in FIG. 4) receives a data symbol vector y (block 510), the receiving device may define a candidate data symbol vector x of estimated transmitted data symbols $x_1, \ldots, x_S$ and calculate LLRs for bits in the data symbols $x_2, \ldots, x_S$ using one equation (block 530), and, separately, calculate the LLRs for the bits in the data symbol $x_1$ using another equation (block 540). It should be noted that although equation (6) groups symbols $x_1, \ldots, x_S$ into two groups $x_2, \ldots, x_S$ and $x_1$, other groupings are possible. For instance, any one of the symbols $x_1, \ldots, x_S$ may be grouped into one group, and the remaining symbols may be grouped into another group. Therefore, some example groupings include $x_1, \ldots, x_{S-1}$ and $x_S$; or $x_1, \ldots, x_l, x_{l+2}, \ldots, x_S$ and $x_{l+1}$.

In order to calculate the LLRs for bits in data symbols $x_2, \ldots, x_S$, (block 530), the receiving device may generally determine an optimum global value of $x_1$ (further referred to as $\hat{x}_1$) for each possible combination of $(x_2, \ldots, x_S)$ that minimizes the distance $\|y-Hx\|^2$ (block 532). Because the determination of $\hat{x}_1$ may be reduced to a one-dimensional problem, $\hat{x}_1$ may be determined without performing any calculations of $\|y-Hx\|^2$. For example, $\hat{x}_1$ for a given $(x_2, \ldots, x_S)$, i.e., $\hat{x}_1 | (x_2, \ldots, x_S)$ may be determined using a technique called Maximal Ratio Combining (MRC). In particular, $\hat{x}_1$ may be determined as the value corresponding to the constellation point nearest to the normalized MRC output $x_{1,MRC}$. More specifically, $\hat{x}_1 | (x_2, \ldots, x_S)$ may be determined as follows (it should be noted that no $\|y-Hx\|^2$ calculations are performed in calculating $x_{1,MRC}$ or $\hat{x}_1 | (x_2, \ldots, x_S)$):

$$\begin{aligned}\hat{x}_1 \mid (x_2, \ldots, x_S) &= \operatorname*{argmin}_{x_1 \in Q} \|(y - (h_2 x_2 + \ldots + h_S x_S)) - h_1 x_1\|^2 \quad (7)\\ &= \operatorname*{argmin}_{x_1 \in Q} |h_1^H (\tilde{y} - h_1 x_1)|^2 \\ &= \operatorname*{argmin}_{x_1 \in Q} \left| \frac{h_1^H \tilde{y}}{\|h_1\|^2} - x_1 \right|^2 \\ &= \operatorname*{argmin}_{x_1 \in Q} |x_{1,MRC} - x_1|^2 \end{aligned}$$

where Q is a set of considered $x_1$, $\tilde{y}=y-(h_2 x_2 + \ldots + h_S x_S)$ and $$x_{1,MRC} = \frac{h_1^H \tilde{y}}{\|h_1\|^2}.$$

Figure 6A:
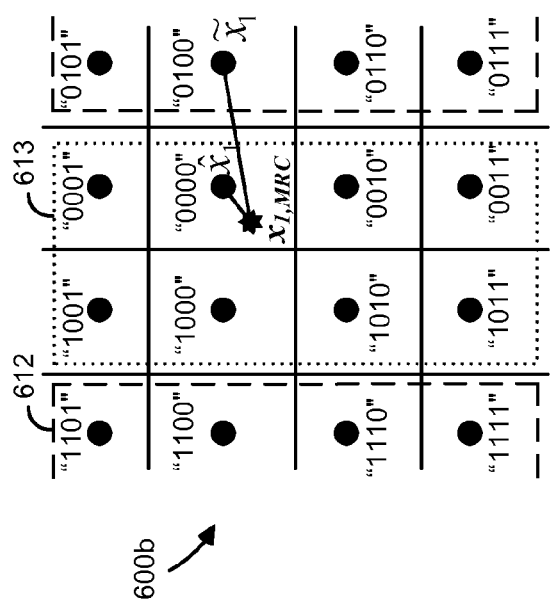
FIGS. 6A-6D are example constellation sets illustrating a multi-stream ML demodulation method.

Referring to the constellation diagram in FIGS. 6A-6D, if a 16-QAM scheme is used, once $x_{1,MRC}$ is calculated, the global optimum value $\hat{x}_1 | (x_2, \ldots, x_S)$ may be determined as the value of the constellation point on the constellation diagram 600 that is nearest to $x_{1,MRC}$. For instance, FIG. 6A illustrates an example 16-QAM constellation diagram 600a for determining $\hat{x}_1 | (x_2, \ldots, x_S)$ based on $x_{1,MRC}$. In the example illustrated in FIG. 6A, the nearest constellation point to $x_{1,MRC}$ is the constellation point corresponding to the value "0000." Accordingly, in this example, the global optimum value $\hat{x}_1 | (x_2, \ldots, x_S)$ is "0000."

It should be noted that determining the constellation point nearest to $x_{1,MRC}$ does not require a calculation of $\|y-Hx\|^2$ for each, or any, of the constellation points in the constellation diagram. Instead, more efficient techniques, such as slicing, may be used. That is, a constellation point is chosen based on decision boundaries, where the boundaries are located at the midpoints between any two adjacent constellation points. For example, referring to FIG. 6A, the receiving device may determine the constellation point nearest to $x_{1,MRC}$ by creating various boundaries 620-630 on the constellation diagram 600a and identifying the boundaries within which $x_{1,MRC}$ lies. For instance if $x_{1,MRC}$ lies within the boundaries 626, 628, 622 and 624, as illustrated in FIG. 6A, the receiving device may determine, based on these boundaries, that that the constellation point nearest to $x_{1,MRC}$ is the constellation point corresponding to the value "0000."

Once optimum global values $\hat{x}_1$ are determined for each possible combination of $(x_2, \ldots, x_S)$ (block 532), LLRs for bits in symbols $x_2, \ldots, x_S$ (i.e., $L(b_{s,n})$, s=2, ... S) may be calculated at least in part based on the determined optimum global values $\hat{x}_1$ (block 534). More precisely, LLRs for bits in symbols $x_2, \ldots, x_S$ (i.e., $L(b_{s,n})$, s=2, ..., S) may be calculated based on distances $\|y-Hx\|^2$ where $x_1|(x_2, \ldots, x_S)=\hat{x}_1(x_2, \ldots, x_S)$. For each combination of $(x_2, \ldots, x_S)$, $\|y-Hx\|^2$ is calculated for only one possible value of $x_1$, i.e., the optimum global value $\hat{x}_1$, where $x=[\hat{x}_1|(x_2, \ldots, x_S), x_2, \ldots, x_S]$, instead of, for example, 16 possible values of $x_1$ in the case of 16-QAM (block 533). In other words, the calculation of $\hat{x}_1$ reduces the number of candidates for $x_1$, e.g., from 16 to 1 in the case 16-QAM. Once $\|y-Hx\|^2$ is calculated for all $M^{S-1}$ combinations of $(x_2, \ldots, x_S)$ and the corresponding global value $\hat{x}_1|(x_2, \ldots, x_S)$, the LLR may be calculated based on equation (6), for example, by choosing the minimum $\|y-Hx\|^2$.

Figure 6B:
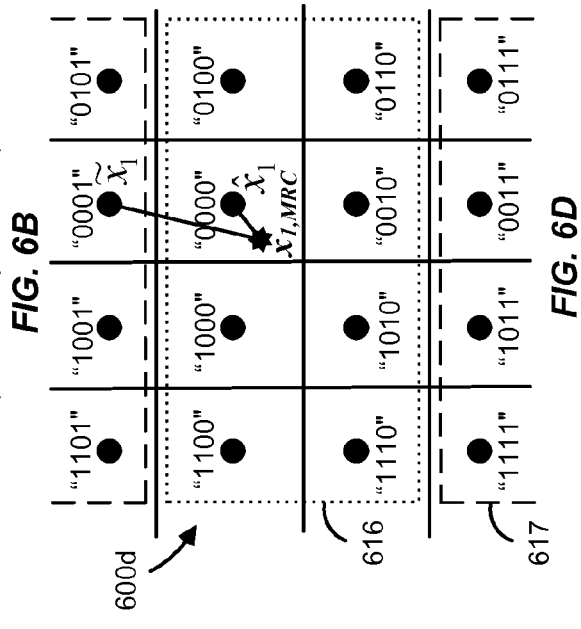
Figure 6C:
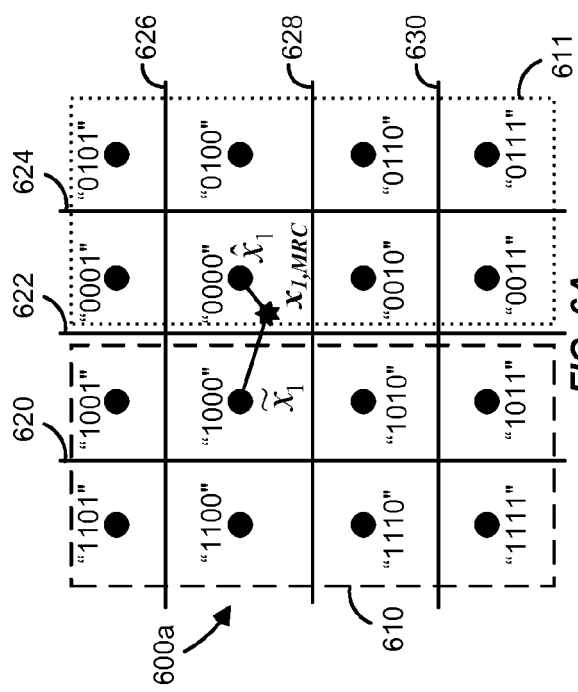
Figure 6D:
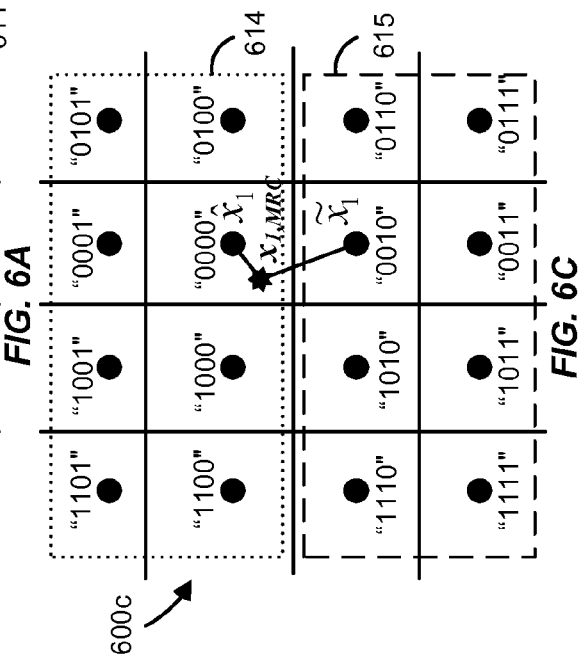

Referring to FIG. 5, in order to calculate the LLRs for bits in data symbol $x_1$, (block 540), the receiving device may first group all possible values of $x_1$ into bit groups (block 542). That is, the receiving device may create one bit group that includes all possible values of $x_1$ with the first bit equal to 0, another bit group that includes all possible values of $x_1$ with the first bit equal to 1, a third bit group that includes all possible values of $x_1$ with the second bit equal to 0, a fourth bit group that includes all possible values of $x_1$ with the second bit equal to 1, and so on. For example, FIGS. 6A-6D illustrate example 16-QAM constellation diagrams 600 that are divided into bit groups 610-617. The constellation diagram 600a in FIG. 6A is divided into one bit group 610 that includes all possible values of $x_1$ with the first bit equal to 1 and one bit group 611 that includes all possible values of $x_1$ with the first bit equal to 0. Likewise, the constellation diagram 600b in FIG. 6B is divided into one bit group 612 that includes all possible values of $x_1$ with the second bit equal to 1 and one bit group 613 that includes all possible values of $x_1$ with the second bit equal to 0; the constellation diagram 600c in FIG. 6C is divided into one bit group 614 that includes all possible values of $x_1$ with the third bit equal to 1 and one bit group 615 that includes all possible values of $x_1$ with the third bit equal to 0; and the constellation diagram 600d in FIG. 6D is divided into one bit group 616 that includes all possible values of $x_1$ with the fourth bit equal to 1 and one bit group 617 that includes all possible values of $x_1$ with the fourth bit equal to 0.

Once all possible values of $x_1$ are grouped into bit groups (block 542), the receiving device may determine an optimum local value of $x_1$ (further referred to as $\tilde{x}_1$) in each bit group for each possible combination of $(x_2, \ldots, x_S)$ (block 532). An optimum local value $\tilde{x}_1$ in a given bit group for a given combination of $(x_2, \ldots, x_S)$ is a value of $x_1$ in that bit group that minimizes the distance $\|y-Hx\|^2$. As before, because the determination of $\tilde{x}_1$ may be reduced to a one-dimensional problem, $\tilde{x}_1$ may be determined without performing any calculations of $\|y-Hx\|^2$, but instead using a technique such as slicing where the decision boundaries are determined based on M/2 points in the corresponding bit group, e.g., 8 points for 16QAM, instead of M points to find the optimum global value. That is, $\tilde{x}_1$ in a given bit group may be determined as the value corresponding to the constellation point nearest to the normalized MRC output $X_{1,MRC}$ in that bit group.

Referring to the constellation diagram 600 in FIGS. 6A-6D, if a 16-QAM scheme is used, once $x_{1,MRC}$ is calculated, the local optimum value $\tilde{x}_1$ in a given bit group may be determined as the value of the constellation point on the constellation diagram 600 and in the respective bit group that is nearest to $X_{1,MRC}$. For instance, as illustrated in FIG. 6A, in the bit group 610 that includes all possible values of $x_1$ with the first bit equal to 1, the nearest constellation point to $X_{1,MRC}$ is the constellation point corresponding to the value "1000." Accordingly, in this example, the local optimum value $\tilde{x}_1$ in the bit group 610 that includes all possible values of $x_1$ with the first bit equal to 1 is "1000." Likewise, as illustrated in FIG. 6B, in the bit group 612 that includes all possible values of $x_1$ with the second bit equal to 1, the nearest constellation point to $x_{1,MRC}$ is the constellation point corresponding to the value "0100." Accordingly, in this example, the local optimum value $\tilde{x}_1$ in the bit group 612 that includes all possible values of $x_1$ with the second bit equal to 1 is "0100."

Once the optimum local values $\tilde{x}_1$ are determined in each bit group and for each possible combination of $(x_2, \ldots, x_S)$ (block 544), LLRs for bits in symbol $x_1$ may be calculated at least in part based on the determined optimum local values $\tilde{x}_1$ (block 546). More precisely, LLRs for bits in symbol $x_1$ may be calculated based on distances $\|y-Hx\|^2$ where) $x_1|(x_2, \ldots, x_S) = \tilde{x}_1|(x_2, \ldots, x_S)$ for each bit group. For each combination of $(x_2, \ldots, x_S)$, $\|y-Hx\|^2$ is calculated only once for every bit group, where $x=[\tilde{x}_1|(x_2, \ldots, x_S), x_2, \ldots, x_S]$, instead of, for example, 16 times in the case of 16-QAM (block 545). Here, when the n-th bit of the optimum global value $\hat{x}_1$ is 1 (or 0), then the optimum local value $\tilde{x}_1$ of the bit group 1 (or 0) of the n-th bit is the same as the optimum global value since the optimum global value is the closest point irrespective of bit grouping. Thus, it is not necessary to find the optimum local values for the S bit groups. Consequently, the steps of calculating $\tilde{x}_1$ and $\hat{x}_1$ reduce the number of candidates for $x_1$, e.g., from 16 to 5 ($1\hat{x}_1+4\tilde{x}_1$'s) in the case 16-QAM. More generally, the reduction in the number of calculations of $\|y-Hx\|^2$ (and, thus, the reduction in complexity) due to the multi-stream ML demodulation method 500 described with respect to FIG. 5 may be $(M-(1+W))M^{S-1}$. Once $\|y-Hx\|^2$ is calculated for all $M^{S-1}$ combinations of $(x_2, \ldots, x_S)$ and the corresponding $(1+W)x_1(1\hat{x}_1+W\tilde{x}_1$'s), the LLR may be calculated based on equation (6), for example, by choosing the minimum $\|y-Hx\|^2$.

Example multi-stream ML demodulation techniques have been described above, but other implementations are also possible. For example, the multi-stream ML demodulation techniques have been described in reference to a wireless communication model where y=Hx+z. However, multi-stream ML demodulation techniques may be used with systems using other communication models. As one example, a receiving device may use the described the multi-stream ML demodulation techniques in conjunction with techniques for QR decomposition of matrix H, such as known QR decomposition techniques. Such a receiving device could use the following model for example:

$$\tilde{y}=Q^*y=Q^*Hx+Q^*z=Rx+\tilde{z} \quad (8)$$

where * denotes a complex conjugate.

The model of equation (8) has a similar form as the y=Hx+z model, except that the matrix R is an upper triangular matrix. Q matrix is a unitary matrix and the R matrix is an upper diagonal matrix, where the R matrix may be represented as $$R = \begin{bmatrix} r_{11} & r_{12} \\ 0 & r_{22} \end{bmatrix}.$$

This feature of matrix R may further lower the complexity of the multi-stream ML demodulation techniques described above because of the form of the matrix R since the computations at the elements of zero in R are not required. Similar to QR decomposition technique, other linear processing techniques can be applied to y.

At least some of the various blocks, operations, and techniques described above may be implemented using hardware, a processor executing firmware instructions, a processor executing software instructions, or any combination thereof. When implemented using a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of decoding a signal transmitted via a multiple input multiple output (MIMO) communication channel, the method comprising:

receiving, at a receiving device, a plurality of received data symbols;

selecting, at the receiving device, a first received data symbol from the plurality of received data symbols, wherein the plurality of received data symbols also includes second received data symbols;

determining, at the receiving device, a plurality of global optimum candidate values of a first estimated transmitted data symbol corresponding to the first received data symbol for different given candidate values of second estimated transmitted data symbols corresponding to the second received data symbols;

calculating, at the receiving device, likelihood values for bits corresponding to the second estimated transmitted data symbols using the plurality of global optimum candidate values of the first estimated transmitted data symbol;

grouping, at the receiving device, all possible values of the first estimated transmitted data symbol into two or more bit groups;

determining, at the receiving device, a plurality of local optimum candidate values for different bit groups and for different given candidate values of second estimated transmitted data symbols corresponding to the second received data symbols; and calculating, at the receiving device, likelihood values for bits corresponding to the first estimated transmitted data symbol using (i) the plurality of global optimum candidate values of the first estimated transmitted data symbol and (ii) the plurality of local optimum candidate values.

2. The method of claim 1, wherein determining the plurality of global optimum candidate values of the first estimated transmitted data symbol comprises, for each given candidate values of second estimated transmitted data symbols corresponding to the second received data symbols:
  determining a corresponding Maximal Ratio Combining (MRC) value for the first estimated transmitted data symbol; and
  determining the corresponding global optimum candidate value of the first estimated transmitted data symbol (i) using the MRC value and (ii) without calculating a plurality of distances between the MRC value and different possible values of the first estimated transmitted data symbol.

3. The method of claim 2, wherein determining the corresponding global optimum candidate value of the first estimated transmitted data symbol comprises determining a possible value of the first estimated transmitted data symbol closest to the MRC value using slicing.

4. The method of claim 1, further comprising:
  determining, at the receiving device, a corresponding Maximal Ratio Combining (MRC) value for the first estimated transmitted data symbol for each given candidate value of second estimated transmitted data symbols;
  wherein determining the plurality of local optimum candidate values for different bit groups and for different given candidate values of second estimated transmitted data symbols corresponding to the second received data symbols comprises, for each given candidate value of second estimated transmitted data symbols:
    determining corresponding local optimum candidate values of the first estimated transmitted data symbol for bit groups that do not include the global optimum value (i) using the MRC value and (ii) without calculating a plurality of distances between the MRC value and different possible values of the first estimated transmitted data symbol.

5. The method of claim 4, wherein determining corresponding local optimum candidate values of the first estimated transmitted data symbol comprises determining possible values of the first estimated transmitted data symbol closest to the MRC value using slicing.

6. The method of claim 1, wherein the likelihood values are log likelihood ratios.

7. The method of claim 1, further comprising decoding, at the receiving device, the received data symbol vector based at least in part on (i) the likelihood values for bits corresponding to the first estimated transmitted data symbol and (ii) the likelihood values for bits corresponding to the second estimated transmitted data symbols.

8. A device for decoding a signal transmitted via a multiple input multiple output (MIMO) communication channel, the device comprising:
  a multi-stream maximum-likelihood (ML) demodulator configured to:
    select a first received data symbol from a plurality of received data symbols, wherein the plurality of received data symbols also includes second received data symbols,
    determine a plurality of global optimum candidate values of a first estimated transmitted data symbol corresponding to the first received data symbol for different given candidate values of second estimated transmitted data symbols corresponding to the second received data symbols,
    calculate likelihood values for bits corresponding to the second estimated transmitted data symbols using the plurality of global optimum candidate values of the first estimated transmitted data symbol,
    group all possible values of the first estimated transmitted data symbol into two or more bit groups,
    determine a plurality of local optimum candidate values for different bit groups and for different given candidate values of second estimated transmitted data symbols corresponding to the second received data symbols, and
    calculate likelihood values for bits corresponding to the first estimated transmitted data symbol using the plurality of global optimum candidate values of the first estimated transmitted data symbol and the plurality of local optimum candidate values; and
  a decoder that decodes the received data symbol vector based at least in part on (i) the likelihood values for bits corresponding to the first estimated transmitted data symbol and (ii) the likelihood values for bits corresponding to the second estimated transmitted data symbols.

9. The device of claim 8, wherein the ML demodulator is configured to determine the plurality of global optimum candidate values of the first estimated transmitted data symbol at least by, for each given candidate values of second estimated transmitted data symbols corresponding to the second received data symbols:
  determining a corresponding Maximal Ratio Combining (MRC) value for the first estimated transmitted data symbol; and
  determining the corresponding global optimum candidate value of the first estimated transmitted data symbol (i) using the MRC value and (ii) without calculating a plurality of distances between the MRC value and different possible values of the first estimated transmitted data symbol.

10. The device of claim 9, wherein the ML demodulator is configured to determine the corresponding global optimum candidate value of the first estimated transmitted data symbol at least by determining a possible value of the first estimated transmitted data symbol closest to the MRC value using slicing.

11. The device of claim 8, wherein the ML demodulator is configured to:
  determine a corresponding Maximal Ratio Combining (MRC) value for the first estimated transmitted data symbol for each given candidate value of second estimated transmitted data symbols;
  determine the plurality of local optimum candidate values for different bit groups and for different given candidate values of second estimated transmitted data symbols corresponding to the second received data symbols at least by, for each given candidate value of second estimated transmitted data symbols:
    determining corresponding local optimum candidate values of the first estimated transmitted data symbol for bit groups that do not include the global optimum value (i) using the MRC value and (ii) without calculating a plurality of distances between the MRC value and different possible values of the first estimated transmitted data symbol.

12. The device of claim 11, wherein the ML demodulator is configured to determine corresponding local optimum candidate values of the first estimated transmitted data symbol at least by determining possible values of the first estimated transmitted data symbol closest to the MRC value using slicing.

13. The device of claim 8, wherein the likelihood values are log likelihood ratios.

14. The device of claim 11, further comprising a channel estimator configured to generate an estimate of the MIMO communication channel;
 wherein the ML demodulator is configured to utilize the estimate of the MIMO communication channel to calculate (i) the likelihood values for bits corresponding to the first estimated transmitted data symbol, and (ii) the likelihood values for bits corresponding to the second estimated transmitted data symbols.

15. The device of claim 11, further comprising a channel estimator configured to generate a matrix H corresponding to an estimate of the MIMO communication channel;
 wherein:
  the ML demodulator is configured to utilize a matrix R to calculate (i) the likelihood values for bits corresponding to the first estimated transmitted data symbol, and (ii) the likelihood values for bits corresponding to the second estimated transmitted data symbols, and
  the matrix R is generated from a QR decomposition of the matrix H.

16. A device for decoding a signal transmitted via a multiple input multiple output (MIMO) communication channel, the device comprising:
 a multi-stream maximum-likelihood (ML) demodulator configured to:
  select one of a plurality of candidate data symbols, the plurality of candidate data symbols defining a candidate vector, wherein the plurality of candidate data symbols correspond to a plurality of transmitted data symbols, wherein a received data symbol vector comprises a plurality of data symbols corresponding to the plurality of transmitted data symbols;
  group all possible values of the selected one candidate data symbol into two or more bit groups;
  select a bit group from the two or more bit groups;
  determine a local optimum candidate value from values in the selected bit group for the selected one candidate data symbol for a given set of values corresponding to all of the plurality of candidate data symbols but the selected one candidate data symbol, the local optimum candidate value minimizing a distance value corresponding to a distance between the received data symbol vector and a channel matrix multiplied with the candidate vector, without calculating the distance value; and
  calculate a likelihood value for a bit in the selected one candidate data symbol based at least in part on the determined local optimum candidate value; and
 a decoder that decodes the received data symbol vector based at least in part on (i) the likelihood values for bits corresponding to the first estimated transmitted data symbol and (ii) the likelihood values for bits corresponding to the second estimated transmitted data symbols.

17. The device of claim 16, wherein the ML demodulator is configured to determine the local optimum candidate value at least by determining a Maximal Ratio Combining (MRC) value for the selected one candidate data symbol.

18. The device of claim 17, wherein the ML demodulator is configured to determine the local optimum candidate value further at least by determining a nearest value of the selected one candidate data symbol in the selected bit group to the MRC value for the selected one candidate data symbol without calculating a distance value between the nearest value of the selected one candidate data symbol in the selected bit group and the MRC value for the selected one candidate data symbol.

19. The device of claim 16, wherein each value in a given one of the two or more bit groups includes one bit that has the same value across all values in the given bit group.

* * * * *